United States Patent [19]

Zwilling

[11] Patent Number: 4,709,730

[45] Date of Patent: Dec. 1, 1987

[54] PIPE CLUSTER UNIT

[75] Inventor: Hermann Zwilling, Rehau, Fed. Rep. of Germany

[73] Assignee: Rehau AG & Co., Rehau, Fed. Rep. of Germany

[21] Appl. No.: 946,132

[22] Filed: Dec. 23, 1986

Related U.S. Application Data

[60] Continuation of Ser. No. 777,361, Sep. 18, 1985, abandoned, which is a division of Ser. No. 587,767, Mar. 9, 1984.

[30] Foreign Application Priority Data

Mar. 10, 1983 [DE] Fed. Rep. of Germany ....... 3308482

[51] Int. Cl.$^4$ .............................................. F16L 9/20
[52] U.S. Cl. .................................. 138/111; 138/112; 285/136
[58] Field of Search ............... 138/111, 112, 115, 116, 138/137, 148, 177, 178; 285/131, 136, 137 R

[56] References Cited

FOREIGN PATENT DOCUMENTS 3045388 7/1982 Fed. Rep. of Germany .
8213407 12/1982 Fed. Rep. of Germany .
627031 7/1949 United Kingdom ................ 138/111

Primary Examiner—James E. Bryant, III
Attorney, Agent, or Firm—Spencer & Frank

[57] ABSTRACT

A pipe cluster unit comprises a plurality of plastic pipes arranged parallel to one another and being in mutual engagement with one another along longitudinal lines of contact to form a pipe cluster and a cover layer bonded to external surface portions of the pipes. The cover layer connects adjoining pipes to one another by bridging the adjoining pipes at locations spaced from respective lines of contact between adjoining pipes.

7 Claims, 3 Drawing Figures

PIPE CLUSTER UNIT

BACKGROUND OF THE INVENTION

This invention relates to a pipe cluster unit formed of individual plastic pipes having a smooth or wavy inner circumferential wall and a method of making the pipe cluster unit. The individual pipes are, after their manufacture, combined into a pipe cluster unit such that at least two adjoining pipes are in a longitudinal linear engagement with one another.

A pipe cluster unit of the above-outlined type is disclosed, for example, in German Offenlegungsschrift (application published without examination) No. 3,045,388. This publication discloses an apparatus for laying communication cables with light wave conductors in the ground. The communication cables with the light wave conductors are introduced (pulled) into a previously manufactured pipe cluster. The pipe cluster is formed of individual plastic pipes and is combined into a unit by stranding together the individual pipes. The known method of stranding such a cluster is, according to the above-noted publication, effected With a large pitch to ensure that upon introduction of the cable into the pipes no large frictional forces are generated. According to the known prior art it is further feasible to combine parallel plastic pipes into a unit by attaching them to one another with mechanical securing elements. The unit may be additionally surrounded by a jacket.

Stranded pipes extend helically in the pipe cluster. Even in case of large-pitch strands difficulties have been experienced during the introduction of the cable into such pipe clusters along substantial lengths.

While the above-noted pipe securing elements permit a twist-free arrangement of the pipes in the cluster, they extend necessarily at least in part beyond the outer circumference of the externally located individual pipes and thus increase, at least in sections, the outer diameter of the pipe cluster. This may be of significant disadvantage particularly in case the pipe cluster is to be surrounded by a common jacket. Such jacket is, as a rule, a cable-protecting pipe which may have been previously laid. The known pipe cluster is then introduced into the cable-protecting pipe. The projecting parts of the mechanical securing elements may cause difficulties during this operation. In addition, because of the projecting mechanical securing elements, the individual pipes must have a correspondingly smaller diameter or a lesser number of individual pipes must be used which is disadvantageous for an optimal utilization of the pipe cluster.

German Gebrauchsmuster (utility model) No. 8,213,407.3 discloses a pipe cluster which is formed of plastic pipes and which is intended for introduction into a cable duct. The pipe cluster is formed of a plurality of individual pipes combined into a mat by means of spacer webs which form integral, one-piece parts of the pipes. The spacer webs are flexible and permit a relative positioning among the individual pipes such that the adjoining pipes are longitudinally in a linear contact with one another. The pipes connected to one another by means of the spacer webs are pulled into a cable duct in an inwardly pivoted condition. During this operation, however, difficulties are experienced because the inward pivoting of the pipes has to be effected at the point of introduction into the cable duct and thus an appropriate apparatus is required at that location. Further, risks are high that the loose arrangement of the outer pipes after a pivotal motion of the pipes leads to such a flexibility of the pipe cluster that, particularly for substantial lengths, an insertion of the pipe cluster into a cable duct is not possible. In such a prior art structure a firm bond of the tubes in the cluster is missing altogether which leads to difficulties in introducing the pipe cluster into a cable duct. If, in order to eliminate this disadvantage, mechanical securing members are used for the pipes, the already noted disadvantages will apply. The pipe mat formed according to the prior art is also disadvantageous in that substantial lengths thereof cannot be wound on a drum. Thus, cable guide pipes combined into a pipe mat are not well adapted for insertion into cable protecting pipes already installed. Further, it is not feasible to directly install the pipe mat into the ground because the flexible spacer webs between the individual pipes do not permit a pipe laying in a single plane.

SUMMARY OF THE INVENTION

It is an object of the invention to provide an improved pipe cluster unit and a method of making the same in which, without the aid of mechanical connecting members, the individual pipes of the cluster are bonded firmly to one another and yet are relatively displaceably held on one another such that a winding of the pipe cluster unit on drums as well as an unhindered introduction of the pipe cluster unit into protecting pipes such as cable ducts is possible. It is a further object of the invention to secure the individual pipes of the pipe cluster to one another in such a manner that without any further relative motion of the individual pipes such a firm bond may be achieved that upon introduction of the pipe cluster unit into a protecting duct an optimal utilization of the latter is feasible. It is still another object of the invention to ensure that the pipe cluster unit may be installed directly into the ground without a protective pipe and without the risk that the laying plane will change.

These objects and others to become apparent as the specification progresses, are accomplished by the invention, according to which, briefly stated, a plurality of pipes are gathered into a cluster in which the pipes are in longitudinal, linear contact with one another; outer wall portions of the individual pipes which are spaced from the mutual contact regions between the pipes are provided with an adhesive or an adhesion enhancing substance or are pretreated by heating and subsequently a pipe cluster unit is formed by applying a heated plastic cover layer on the pretreated wall portions, thus firmly bonding adjoining pipes to one another. Immediately thereafter the heated cover layer is cooled and, by utilizing its properties of shrinkage, it is pressed additionally onto the pretreated wall portions of the individual pipes.

A pipe cluster unit made with the method according to the invention is flexible to such an extent that winding thereof on appropriate drums is possible without risks of a permanent deformation of the inner diameter of the individual pipes. By virtue of the fact that the connecting means for the individual pipes are situated spaced from the contact lines between adjoining pipes, a relative displacement of the individual pipes on one another is feasible within limits of the bond. This also provides for the overall flexibility of the pipe cluster unit within the limits of the pipe wall thicknesses.

The pipe cluster unit made with the method according to the invention may include a selected number of pipes and may have pipes with different diameters. To ensure optimal conditions for the introduction of the pipe cluster unit into a cable duct of circular cross section, it is expedient to select an odd number of individual pipes such that one of the pipes has the greatest diameter, two adjoining individual pipes have an intermediate diameter and the pipes joining the intermediate pipes have the smallest diameter. In such an arrangement, the pipe cluster defines a circumscribable circle and also, the lines of contact between adjoining pipes touch a common circle. Such an arrangement avoids difficulties in a subsequent introduction of the pipe cluster unit into a cable duct. It is to be understood, however, that with the method according to the invention pipe cluster units of any other pipe combination, even units containing an even number of pipes may be made.

It is an essential feature of the method according to the invention that external wall surfaces of the individual pipes are pretreated in zones spaced from the lines of engagement between the pipes for providing a firm pipe cluster unit in which the pipes may shift relative to one another. Such pretreatment may comprise the application of an adhesion enhancing substance (such as "Spezialprimer AP 003" made by Worle Chemie GmbH, Hamburg, Federal Republic of Gemany) or an adhesive (such as "Ultraflex 56" manufactured by Fuler or No. 1475 adhesive made by Bostik). The thus pretreated outer wall portions of the individual pipes are surrounded by a plastic envelope which is preheated for activating the adhesion enhancing substance or the adhesive. In this manner, the adjoining individual pipes are, over the zones of the pretreated wall portions, combined into a cluster unit.

The preparation of the outer wall surfaces of the individual pipes may be effected by heating which enhances a subsequent plastic welding process. Such a heating may be effected simultaneously with the application of a melted synthetic flux whereby the cover layer bonding the individual pipes to one another may be formed by the material of the plastic flux. In such a case the individual pipes may be connected with one another in the immediate vicinity of the line of contact between the pipes.

It is further of significance that immediately after bonding the adjoining pipes to one another by the heated plastic cover layer, the hot cover layer is cooled and thus the shrinkage of the cover layer is so utilized that it exerts a pressure on the pretreated wall portions of the individual pipes. In this manner, the pipe cluster unit formed of the individual pipes connected with one another by the cover layer is additionally strengthened without reducing the flexibility of the pipe cluster unit enhanced by the circumferential displaceability of the longitudinal lines of engagement between pipes.

In addition to gluing or welding the envelope by means of a flux, according to the invention the pipe cluster unit may be made by applying heat and pressure to adjoining individual pipes externally of their line of contact in the zone of the pretreated wall portions for welding adjoining pipes to one another. Such a welding process may be effected, for example, by a spraying device which sprays the plastic cover layer on the pretreated wall portions of the individual pipes. The effects of such a method are the same as described earlier regarding bonding by means of an adhesive or by flux welding. Further, the adjoining individual pipes may be covered externally of their contact lines with a skin-like envelope. For this purpose a plastic sleeve with properties of shrinkage is pulled on the pipe cluster for forming the pipe cluster unit. Subsequently, by application of heat the sleeve is caused to shrink, whereby it lies tightly about the contour of the assembled pipes and thus produces the pipe cluster unit according to the invention. The inside of the sleeve may be provided with an adhesion enhancing substance or an adhesive so that externally of the contact lines between the adjoining individual pipes there is formed a firm, skin-like jacket for the pipe cluster. The same advantages as discussed earlier apply to a pipe cluster unit made according to this method.

For forming the pipe cluster unit, it is further within the scope of the invention to wrap the assembled pipes with a film whose face oriented towards the pipe cluster may be provided with an adhesion enhancing substance or an adhesive. In this case too, the envelope is spaced from the contact lines of adjoining individual pipes and thus the particular flexibility (due to the possibility of shifting of the pipes relative to one another) of the pipe cluster made according to the invention is ensured.

According to an advantageous further feature of the method according to the invention, the pipes are gathered to form a pipe cluster and then the adjoining individual pipes are heated beyond the melting temperature of their material on their outer faces over an area spaced from their mutual line of engagement and immediately subsequently, while maintaining the melting temperature of the molten upper surface zones, a jacket layer is provided about the pipes to assume an adhering relationship therewith. According to this feature of the invention, the pipe cluster is provided along its outer contour with an envelope by spraying which provides for an optimal securing of the pipes to one another while maintaining the required flexibility of the pipe cluster according to the invention. The spraying of the pipes to form the envelope may be effected about the external contour or about the internal contour of the pipe cluster. It is of importance, however, that the bonding of the individual pipes by gluing or welding occurs either only along the external contour or only along the inner contour, because if the bonding is effected both externally and internally, the pipe cluster would be too rigid which would render difficult the winding of the pipe cluster on a drum or the insertion of the pipe cluster unit into a cable duct.

In case only partial zones of the adjoining individual pipes are bonded by gluing or partial welding, it is within the scop of the invention to alternatingly bond together pipe portions externally and internally of the line of contact between adjoining pipes, as viewed in the circumferential direction of the pipe cluster. In this manner, the flexibility of the pipe cluster according to the invention may be significantly increased. Whether bonding between the pipes is effected by a circumferentially closed envelope provided on the outer surface of the pipe cluster or by a circumferentially discontinuous cover layer, it is expedient to connect the layer with the melted surfaces of the individual pipes in a homogeneous manner. For this purpose, the surface portions are, by means of simultaneous or previous heating melted to such an extent that a substantial amount of molten thermoplastic material of the individual pipes is available to achieve by the welding process a homogeneous bonding with the cover layer.

The method according to the invention for making the pipe cluster unit may be effected in a continuous or intermittent manner. In the continuous process the individual pipes are, by appropriate guide means, gathered to form a cluster, treated on the free outer wall surfaces and bonded to one another as described above to form the pipe cluster unit. For applying the cover layer over the outer or inner circumference of the pipe cluster, the latter may be introduced into a heated spraying head which first melts the circumferential surfaces of the pipe and subsequently the cover layer is sprayed on.

The pipe cluster unit made with a method according to the invention is, subsequent to manufacture, wound on a drum and shipped for further use. The flexibility of the pipe cluster unit achieved according to the invention may be influenced by the wall thickness of the individual pipes as well as the thickness of the cover layer. It is of importance to ensure that the cover layer has a minimum thickness which, during winding on the drums prevents a collapse or buckling of the pipe cluster or the individual pipes.

By way of example, a pipe cluster unit was made from the following individual pipes: one pipe with an inner diameter of 35 mm and a wall thickness of 2 mm, two pipes with an inner diameter of 25 mm and a wall thickness of 1.5 mm, and two pipes with an inner diameter of 20 mm and a wall thickness of 1.5 mm. The pipes were arranged with respect to one another to obtain a symmetrical configuration. For this purpose the two medium-sized pipes contacted the large-diameter pipe and the small-diameter pipes contacted each other and the two medium-sized pipes. The continuous cover layer about the outer circumference of the pipe cluster had a wall thickness of 1.5 mm.

The above-described pipe cluster unit was, immediately after making the same, cooled in a calibrated vacuumized water tank whereby the temperature of the cover layer was lowered from between 150° and 180° C. to room temperature by the water which had a temperature of 10°–15° C. In a cooling of this type the pipe is advanced through the tank and is either aprayed with water, or submerged in a water bath. After cooling, the pipe cluster unit was wound on a storage drum of a diameter of 1.5 m. For the individual pipes and for the cover layer "soft" polyethylene was used. According to the invention, synthetic materials like "hard" polyethylene, polypropylene, polyamide, polybutene and other appropriate polyolefins may also be used.

With the method according to the invention the pipe cluster may be made in various ways. Thus, the individual pipes may be separately manufactured and stored. Dependent upon the number of the individual pipes in the planned pipe cluster, the pipes are recalled from storage, gathered in the desired configuration, their free outer surfaces are treated as described and then the pipes are connected to one another by gluing or welding. It is also possible to continuously make the desired number of pipes in a tool, to continuously gather the pipes to form the desired pipe cluster and then to combine them in a pipe cluster unit as described.

During the welding of the individual pipes for forming the pipe cluster unit, it is to be ensured that during the melting of the free upper surface zones of the individual pipes the welding temperature is reached or slightly exceeded. It is to be ensured further that the melting is not effected throughout the entire thickness of the individual pipe, because in such a case during cooling shrinkage phenomena would appear in the individual pipe which would adversely affect the smooth inner surface thereof, necessary for subsequent use. Thus, during the welding process the free upper surface should be only slightly melted such that only a few hundredths of a millimeter of the wall thickness of the individual pipes are affected. If in the above-described example the cover layer is applied by a spraying head to the outer circumference of the pipe cluster, the inner contour of the spraying head has a temperature of 195° C. in case "soft" polyethylene is used for the material of the individual pipes.

In case of a running speed of the pipe cluster between 2 and 4 m/sec., the pipe surface to be sprayed is brought to at least 108° C. of welding temperature prior to the beginning of the spraying step.

A pipe cluster unit formed of individual plastic pipes having a smooth inner circumferential wall wherein the individual pipes are, after their manufacture, assembled into a pipe cluster in such a manner that at least two adjoining pipes are in longitudinal linear contact with one another, is characterized according to the invention in that the adjoining individual pipes, externally of their line of contact are, at adjacent external wall surfaces, connected to one another by means of a surrounding cover layer. The cover layer is preferably a skin-like envelope layer which is tensioned about the pipe cluster. The cover layer may be glued or welded to the outer wall surfaces of the individual pipes.

DESCRIPTION OF THE PREFERRED EMBODIMENTS

Figure 1:
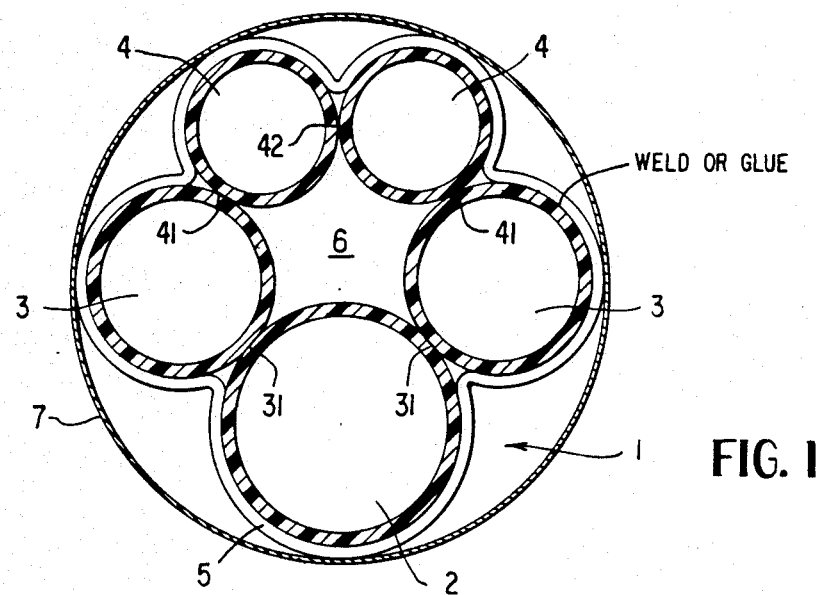
FIG. 1 is a cross-sectional view of a first embodiment of the invention.

FIG. 1 illustrates a pipe cluster unit generally indicated at 1. The cluster comprises a pipe 2 of largest diameter which is contacted by two further pipes 3 of intermediate diameter. The pipes 3 are spaced from one another. Each pipe 3 is in contact with a separate, additional pipe 4 of smallest diameter. The pipes 4 are in a contacting relationship with one another. The pipes 3 and the pipe 2 are in contact along a longitudinal line of engagement 31 while the pipes 4 engage the respective pipes 3 along a line of engagement 41 and contact one another along a line of engagement 42. The outer circumference of the pipe cluster is surrounded by a circumferentially continuous envelope layer 5 which follows the contour of the five pipes 2, 3 and 4, but which remains spaced from the lines of engagement 31, 41 and 42. As seen in FIG. 1, each pipe is in contact with two other pipes and the pipes together surround and define an inner space 6; in that zone the pipes are free from any bonding means.

The pipe cluster unit 1 may be surrounded by a jacket 7 which may be a cable duct or a protective pipe.

Figure 2:
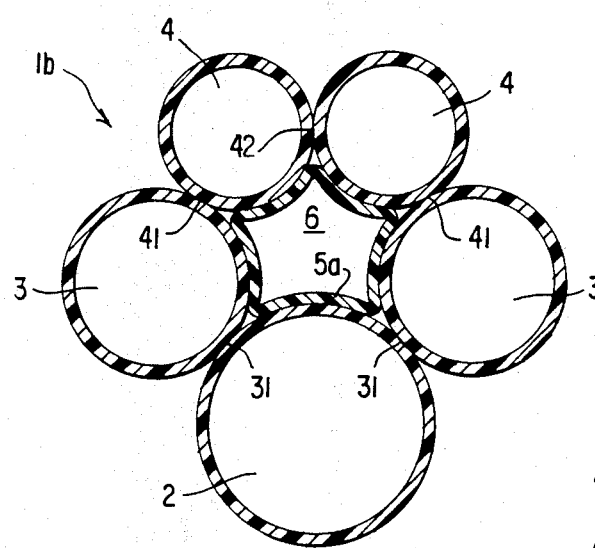
FIG. 2 is a cross-sectional view of a second embodiment of the invention.

FIG. 2 shows a pipe cluster unit 1a in which the cover layer 51 is not continuous about the external circumference of the pipe cluster, but constitutes only local bonds on the externally-lying outer surface portions in the vicinity of, but spaced from the lines of engagement 31, 41 and 42. As a first alternative, such local bonds may be provided at locations along the inner circumference of the pipe cluster as designated at 52 or, as a second alternative, the bonds at 51 and 52 may alternate between the outer and the inner circumference of the pipe cluster as viewed in the circumferential direction thereof. The bonds at 51 and/or 52 may be effected by gluing or welding.

Figure 3:
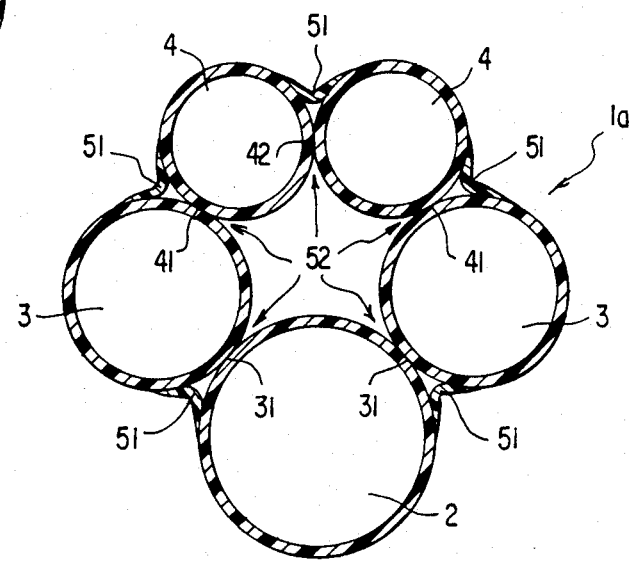
FIG. 3 is a cross-sectional view of a third embodiment of the invention.

FIG. 3 shows a pipe cluster unit 1b in which a circumferentially continuous cover layer 5a is applied to the inwardly oriented surfaces of the pipes 2, 3 and 4.

It will be understood that the above description of the present invention is susceptible to various modifications, changes and adaptations, and the same are intended to be comprehended within the meaning and range of equivalents of the appended claims.

What is claimed is:

1. A flexible pipe cluster unit comprising
   (a) a plurality of synthetic pipes arranged parallel to one another; each pipe being in mutual engagement solely with two adjoining pipes along longitudinal lines of contact to form a pipe cluster; and
   (b) a cover layer united by a bond with external surface portions of each of said pipes; said cover layer connecting adjoining pipes to one another by bridging the adjoining pipes at locations spaced from respective lines of contact between adjoining pipes providing bond-free pipe surface portions situated between said respective lines of contact and said cover layer; said surface portions enclosing an empty space; the pipes of the cluster together surrounding an inner space providing a means for allowing a shift of the pipes relative to one another.

2. A pipe cluster unit as defined in claim 1, wherein said cover layer is formed of a skin-like, circumferentially continuous envelope tightly surrounding said pipe cluster.

3. A pipe cluster unit as defined in claim 1, wherein said cover layer is glued to said surface portions.

4. A pipe cluster unit as defined in claim 1, wherein said cover layer is welded to said surface portions.

5. A pipe cluster unit as defined in claim 1, wherein said cover layer entirely surrounds said pipe cluster.

6. A flexible pipe cluster unit as defined in claim 1, wherein said bond comprises an adhesive bond.

7. A flexible pipe cluster unit as defined in claim 1, wherein said bond comprises a welded bond.

* * * * *